US011869412B2

(12) United States Patent
In et al.

(10) Patent No.: US 11,869,412 B2
(45) **Date of Patent: *Jan. 9, 2024**

(54) DISPLAY DEVICE

(71) Applicant: Samsung Display Co., Ltd., Yongin-si (KR)

(72) Inventors: Hai Jung In, Yongin-si (KR); Ki Myeong Eom, Yongin-si (KR); Kyong Hwan Oh, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 83 days.

This patent is subject to a terminal disclaimer.

(21) Appl. No.: 17/567,827

(22) Filed: Jan. 3, 2022

(65) Prior Publication Data

US 2022/0301484 A1 Sep. 22, 2022

Related U.S. Application Data

(63) Continuation of application No. 16/897,436, filed on Jun. 10, 2020, now Pat. No. 11,217,149.

(30) Foreign Application Priority Data

Nov. 4, 2019 (KR) ........................ 10-2019-0139750

(51) Int. Cl.
*G09G 3/3266* (2016.01)
*G09G 3/20* (2006.01)

(52) U.S. Cl.
CPC ... *G09G 3/2092* (2013.01); *G09G 2300/0861* (2013.01); *G09G 2310/0267* (2013.01); *G09G 2310/0275* (2013.01); *G09G 2330/00* (2013.01)

(58) Field of Classification Search
CPC ............... G09G 3/2092; G09G 3/3233; G09G 2310/0251; G09G 2310/0267;
(Continued)

(56) References Cited

U.S. PATENT DOCUMENTS 8,111,218 B2 2/2012 Choi
8,587,578 B2 11/2013 Choi
(Continued)

FOREIGN PATENT DOCUMENTS

KR 10-0873074 12/2008
KR 10-1040806 6/2011
(Continued)

OTHER PUBLICATIONS

Non-Final Office Action dated Apr. 15, 2021, in U.S. Appl. No. 16/897,436.
(Continued)

*Primary Examiner* — Dennis P Joseph
(74) *Attorney, Agent, or Firm* — H.C. Park & Associates, PLC

(57) ABSTRACT

A display device including a pixel connected to a first scan line, a second scan line, a third scan line, an emission control line, and a data line; a first driver supplying a first scan signal to the first scan line in a first period; a second driver supplying a second scan signal to the second scan line in the first period; a third driver supplying a third scan signal to the third scan line in the first and second periods; an emission driver supplying a control signal to the emission control line in the first and second periods; and a data driver supplying a data signal to the data line in the first period, in which a width of the second scan signal is greater than that of the first scan signal to overlap a plural first scan signals respectively supplied to first scan lines during the first period.

15 Claims, 12 Drawing Sheets

(58) Field of Classification Search
CPC ... G09G 2310/0278; G09G 2310/0202; G09G 3/3266
See application file for complete search history.

(56) References Cited

U.S. PATENT DOCUMENTS

| | | | |
|---|---|---|---|
| 9,024,934 | B2 | 5/2015 | Park et al. |
| 10,991,300 | B2 | 4/2021 | Kim et al. |
| 2015/0356925 | A1 | 12/2015 | Lee et al. |
| 2018/0061324 | A1 | 3/2018 | Kim et al. |
| 2018/0158393 | A1 | 6/2018 | Woo et al. |
| 2018/0158409 | A1* | 6/2018 | Byun .................. G09G 3/3208 |
| 2018/0158410 | A1* | 6/2018 | Jeon .................... H01L 27/1222 |
| 2018/0233084 | A1* | 8/2018 | Kwon .................. G09G 3/3233 |
| 2018/0261163 | A1* | 9/2018 | Hyun ..................... G09G 3/003 |
| 2019/0096330 | A1 | 3/2019 | Kim et al. |
| 2021/0201764 | A1 | 7/2021 | Oh et al. |
| 2021/0225266 | A1 | 7/2021 | Hyun et al. |

FOREIGN PATENT DOCUMENTS

| | | |
|---|---|---|
| KR | 10-2014-0013586 | 2/2014 |
| KR | 10-2018-0023098 | 3/2018 |
| KR | 10-2019-0075194 | 7/2019 |
| KR | 10-2021-0086801 | 7/2021 |
| KR | 10-2021-0092870 | 7/2021 |

OTHER PUBLICATIONS

Notice of Allowance dated Aug. 31, 2021, in U.S. Appl. No. 16/897,436.
Korean Office Action dated Sep. 25, 2023, in Korean Patent Application No. 10-2019-0139750 (with English Translation).

* cited by examiner

DISPLAY DEVICE

CROSS-REFERENCE TO RELATED APPLICATIONS

This application is a Continuation of U.S. patent application Ser. No. 16/897,436, filed on Jun. 10, 2020, which claims priority from and the benefit of Korean Patent Application No. 10-2019-0139750, filed on Nov. 4, 2019, each of which is hereby incorporated by reference for all purposes as if fully set forth herein.

BACKGROUND

Field

Exemplary embodiments of the invention relate generally to an electronic device and, more particularly, to a display device.

Discussion of the Background

A display device displays an image on a display panel by using control signals applied from the outside.

The display device includes a plurality of pixels. Each of the pixels includes a plurality of transistors, a light emitting device electrically connected to the transistors, and a capacitor. The transistors are turned on respectively in response to signals provided through lines to generate a driving current, and the light emitting device emits light in accordance to the driving current.

Recently, needs for a display device corresponding to various driving frequencies (or image refresh rates) for high resolution driving, low power driving, stereoscopic image driving, etc. have been raised. Accordingly, in order to use advantages of a poly-silicon semiconductor transistor and an oxide semiconductor transistor, research for a pixel structure in which the poly-silicon semiconductor transistor and the oxide semiconductor transistor are combined and included in one pixel has been conducted.

The above information disclosed in this Background section is only for understanding of the background of the inventive concepts, and, therefore, it may contain information that does not constitute prior art.

SUMMARY

Display devices constructed according to exemplary embodiments of the invention are capable of securing a threshold voltage compensation time of a first transistor of a pixel and periodically applying a bias voltage to the first transistor.

Additional features of the inventive concepts will be set forth in the description which follows, and in part will be apparent from the description, or may be learned by practice of the inventive concepts.

A display device according to an exemplary embodiment includes: pixels connected to first scan lines, second scan lines, third scan lines, emission control lines, and data lines; a first scan driver configured to supply a first scan signal to each of the first scan lines in a first period; a second scan driver configured to supply a second scan signal to each of the second scan lines in the first period; a third scan driver configured to supply a third scan signal to each of the third scan lines in the first period and a second period; an emission driver configured to supply an emission control signal to the emission control lines in the first period and the second period; and a data driver configured to supply a data signal to the data lines in the first period, in which a width of the second scan signal is greater than that of the first scan signal.

The first scan driver may sequentially supply the first scan signal to the first scan lines, and the second scan driver may simultaneously supply the second scan signal to at least two of the second scan lines.

The third scan driver may simultaneously supply the third scan signal to at least two of the third scan lines.

The first period may be repeated, when an image refresh rate is a first frequency, and the second period may be activated at least once just after the first period, when the image refresh rate is less than the first frequency.

A pixel located on an $i^{th}$ (i is a natural number) horizontal line among the pixels may include: a light emitting device; a first transistor including a first electrode connected to a first node electrically connected to a first power source, the first transistor controlling a driving current, based on a voltage of a second node; a second transistor connected between one of the data lines and the first node, the second transistor being turned on by the first scan signal supplied to an ith first scan line; a third transistor connected between a third node connected to a second electrode of the first transistor and the second node, the third transistor being turned on by the second scan signal supplied to an $i^{th}$ second scan line; and a fourth transistor turned on by the third scan signal supplied to an ith third scan line to supply a bias voltage to the first node.

The pixel located on the $i^{th}$ horizontal line may further include: a fifth transistor connected between the first power source and the first node, the fifth transistor being turned off by the emission control signal supplied to an $i^{th}$ emission control line; a sixth transistor connected between the third node and a first electrode of the light emitting device, the sixth transistor being turned off by the emission control signal; and a storage capacitor connected between the first power source and the second node.

The pixel located on the $i^{th}$ horizontal line may further include: a seventh transistor connected between the third node and a first initialization power source, the seventh transistor being turned on by the first scan signal supplied to an $(i-1)^{th}$ first scan line; and an eighth transistor connected between the first electrode of the light emitting device and a second initialization power source, the eighth transistor being turned on by the third scan signal supplied to the $i^{th}$ third scan line.

The seventh transistor and the second transistor may be sequentially turned on when the third transistor is turned on.

The seventh transistor of a pixel located on an $(i+1)^{th}$ horizontal line and the third transistor of the pixel located on the $(i+1)^{th}$ horizontal line may be sequentially turned on when the third transistor of the pixel located on the $i^{th}$ horizontal line is turned on.

A turn-on period of the third transistor and a turn-on period of the fourth transistor may not overlap with each other.

The second scan driver may supply the second scan signal to the $i^{th}$ second scan line in the first period in a plurality of times.

The display device may further include a power supply configured to supply a bias power source corresponding to the bias voltage and the first and second initialization power sources to the pixels.

The power supply may supply the bias power source having a first voltage level in the first period, and supply the bias power source having a second voltage level different from the first voltage level in the second period.

The power supply may supply the first initialization power source having a first voltage level in the first period, and supply the first initialization power source having a second voltage level different from the first voltage level in the second period.

When the second period is repeated plural times, the power supply may change a voltage level of at least one of the first initialization power source, the second initialization power source, and the bias power source in stages.

The fourth transistor may be connected between the first node and the $i^{th}$ emission control line.

The emission driver may supply a high level of the emission control signal supplied in the first period and a high level of the emission control signal supplied in the second period as different voltage levels.

Each of the second transistor and the fourth transistor may be a poly-silicon semiconductor transistor.

The third transistor may be an oxide semiconductor transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
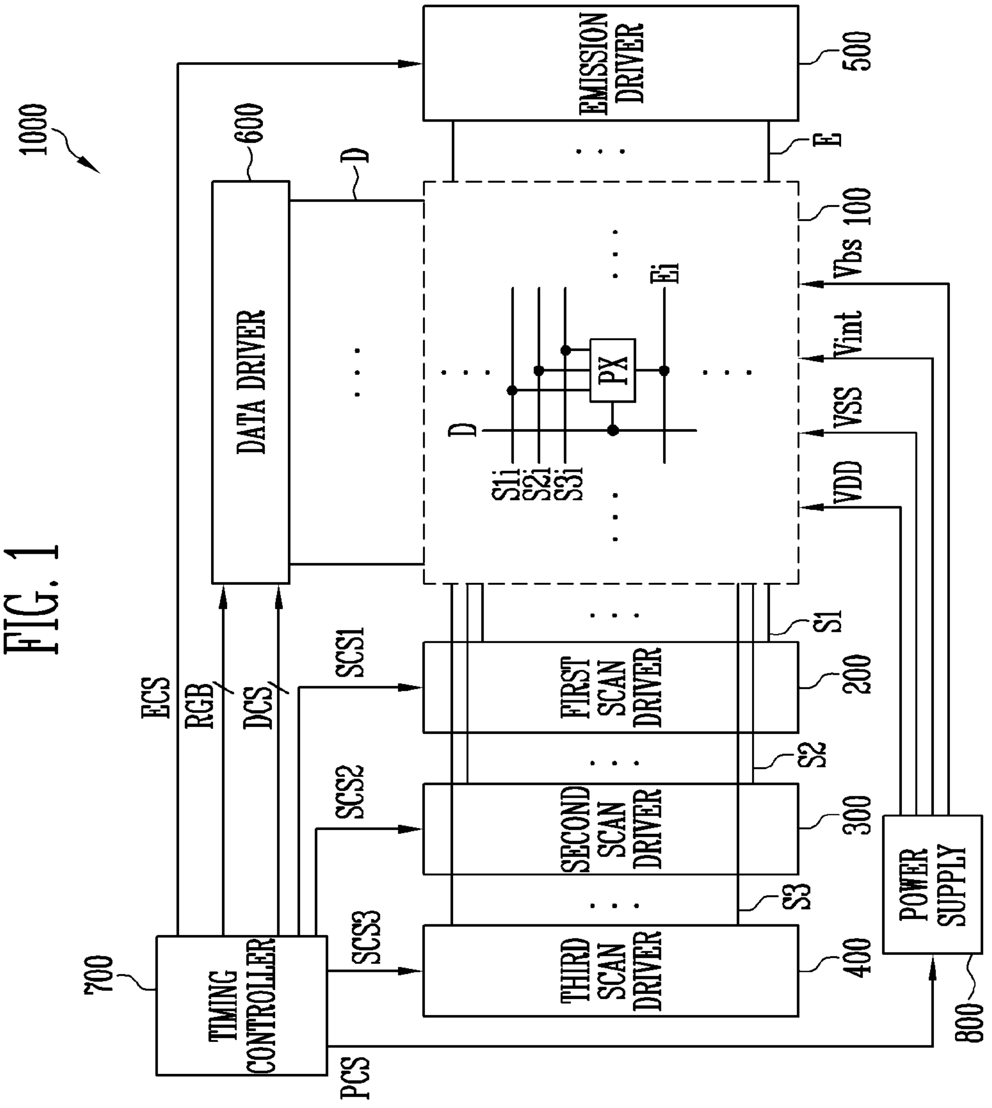
FIG. 1 is a block diagram illustrating a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments will be described in more detail with reference to the accompanying drawings. Throughout the drawings, the same reference numerals are given to the same elements, and thus, repeated descriptions will be omitted.

FIG. 1 is a block diagram illustrating a display device according to an exemplary embodiment.

Referring to FIG. 1, the display device 1000 may include a pixel unit 100, scan drivers 200, 300, and 400, an emission driver 500, a data driver 600, and a timing controller 700. The display device 1000 may further include a power supply 800.

In an exemplary embodiment, the scan drivers 200, 300, and 400 may be classified as a first scan driver 200, a second scan driver 300, and a third scan driver 400 based on configurations and operations thereof. However, the classification of the scan drivers 200, 300, and 400 is for convenience of description, and in some exemplary embodiments, at least some of scan drivers may be integrated as a single driving circuit, a single module, etc. according to designs.

The display device 1000 may display an image at various driving frequencies (e.g., image refresh rates or screen refresh rates) according to driving conditions. As used herein, a driving frequency may refer to a frequency at which a data signal is substantially written to a driving transistor of a pixel PX. For example, the driving frequency may be referred to as a screen scanning rate or a screen refresh frequency, and represent a frequency at which a display screen is refreshed for one second.

In an exemplary embodiment, an image refresh rate is an output frequency of the data driver 600 and/or the first scan driver 200. For example, a refresh rate for driving a moving image may be about 60 Hz or more (e.g., 120 Hz).

In an exemplary embodiment, the display device 1000 may control an output frequency of the first and second scan drivers 200 and 300, and an output frequency of the data driver 600, which corresponds to the output frequency of the first and second scan drivers 200 and 300 according to driving conditions. For example, the display device 1000 may display an image in accordance to various image refresh rates of 1 Hz to 120 Hz. However, the inventive concepts are not limited thereto, and in some exemplary embodiments, the display device 1000 may display an image at an image refresh rate of 120 Hz or more (e.g., 240 Hz or 480 Hz).

The pixel unit 100 includes pixels PX connected to data lines D, scan lines S1, S2, and S3, and emission control lines E. The pixels PX may be supplied with voltages of a first power source VDD, a second power source VSS, and an initialization power source Vint from the outside. In an exemplary embodiment, the pixels PX may be further supplied with a voltage of a bias power source Vbs from the outside.

The timing controller 700 may generate a first scan driving control signal SCS1, a second scan driving control signal SCS2, a third scan driving control signal SCS3, an emission driving control signal ECS, and a data driving control signal DCS in accordance with synchronization signals supplied from the outside. The first scan driving control signal SCS1 may be supplied to the first scan driver 200, the second scan driving control signal SCS2 may be supplied to the second scan driver 300, and the third scan driving control signal SCS3 may be supplied to the third scan driver 400. In addition, the emission driving control signal ECS may be supplied to the emission driver 500, and the data driving control signal DCS may be supplied to the data driver 600. Also, the timing controller 700 may realign image data supplied from the outside and supply the realigned image data to the data driver 600.

A first scan start pulse and clock signals may be included in the first scan driving control signal SCS1. The first scan start pulse may control a first timing of a first scan signal. The clock signals may be used to shift the first scan start pulse.

A second scan start pulse and clock signals may be included in the second scan driving control signal SCS2. The second scan start pulse may control a first timing of a second scan signal. The clock signals may be used to shift the second scan start pulse.

A third scan start pulse and clock signals may be included in the third scan driving control signal SCS3. The third scan start pulse may control a first timing of a third scan signal. The clock signals may be used to shift the third scan start pulse.

In an exemplary embodiment, at least one of the first to third scan start pulses may have a pulse width different from that of the other of the first to third scan start pulses. As such, the scan signals corresponding to the first to third scan start pulses may have different widths.

An emission control start pulse and clock signals may be included in the emission driving control signal ECS. The emission control start pulse may control a first timing of an emission control signal. The clock signals may be used to shift the emission control start pulse.

A source start pulse and clock signals may be included in the data driving control signal DCS. The source start pulse may control a sampling start time of data. The clock signals may be used to control a sampling operation.

In some exemplary embodiments, the timing controller 700 may generate a power control signal PCS for controlling driving of the power supply 800. The power control signal PCS may control a supply timing and/or voltage level of at least one of the first power source VDD, the second power source VSS, the initialization power source Vint, and the bias power source Vbs.

The data driver 600 may convert realigned image data RGB into a data signal in an analog form. The data driver 600 supplies a data signal to the data lines D in accordance with the data driving control signal DCS.

The data driver 600 supplies a data signal to the data lines D during one frame period in accordance with an image refresh rate. For example, the data driver 600 supplies a data signal to the data lines D at a frequency equal to the image refresh rate. The data signal supplied to the data lines D may be supplied in synchronization with a scan signal supplied to first scan lines S1.

The first scan driver 200 supplies a scan signal to the first scan lines S1 based on the first scan driving control signal SCS1. For example, the first scan driver 200 may sequentially supply a first scan signal to the first scan lines S1. The first scan signal is set to a gate-on voltage, such that transistors included in the pixels PX can be turned on.

In an exemplary embodiment, the first scan driver 200 may supply the first scan signal to the first scan lines S1 in a first period. The first period may be repeated at a frequency (e.g., a first frequency) equal to an image refresh rate of the display device 1000. As such, the first scan driver 200 may supply the first scan signal at a frequency equal to the image refresh rate. For example, when the first frequency is 120 Hz, the first period may be repeated at 120 Hz.

The first period may include an emission period and a non-emission period. The first period may be a period in which a data signal corresponding to an image is written to the pixels PX. Accordingly, the first period may be defined as a data programming sub-frame.

The second scan driver 300 supplies a scan signal to the second scan lines S2, based on the second scan driving control signal SCS2. For example, the second scan driver 300 may sequentially supply a second scan signal to the second scan lines S2. The second scan signal is set to a gate-on voltage, such that the transistors included in the pixels PX can be turned on.

In an exemplary embodiment, the second scan driver 300 may supply the second scan signal to the second scan lines S2 in the first period. As such, the second scan driver 300 may supply the second scan signal to the second scan lines S2 at a frequency equal to the image refresh rate.

The third scan driver 400 supplies a scan signal to third scan lines S3 based on the third scan driving control signal SCS3. For example, the third scan driver 400 may sequentially supply a third scan signal to the third scan lines S3. The third scan signal is set to a gate-on voltage, such that the transistors included in the pixels PX can be turned on.

The gate-on voltage of a scan signal supplied to a P-type transistor among the first to third scan signals may have a low level (or logic low level), and the gate-on voltage of a scan signal supplied to an N-type transistor among the first to third scan signals may have a high level (or logic high level).

In an exemplary embodiment, the third scan driver 400 may supply the third scan signal to the third scan lines in the first period and a second period. As such, the third scan driver 400 may supply the third scan signal to the third scan lines S3 regardless of the image refresh rate.

The second period may be activated when the display device 1000 is driven at a low frequency. For example, when the image refresh rate is less than the first frequency, the second period just after the first period may be activated at least once.

For example, the second period may include an emission period and a non-emission period. The second period may be a bias period in which a bias is applied to the pixels PX by the third scan signal. For example, a predetermined bias voltage may be applied to a source electrode and/or a drain electrode of the driving transistor of the pixel PX in response to the third scan signal, and the driving transistor may be on-biased. Since the second period is a driving period applied to low frequency driving, and is a period in which an image programmed in the first period is held, the second period may be defined as a holding sub-frame.

A number of times the second period is consecutively repeated (e.g., a total length of consecutive second periods) may be changed depending on the image refresh rate.

The emission driver 500 may receive the emission driving control signal from the timing controller 700, and supply an emission control signal to the emission control lines E based on the emission driving control signal ECS. For example, the emission driver 500 may sequentially supply an emission control signal to the emission control lines E.

When the emission control signal is sequentially supplied to the emission control lines E, pixels PX do not emit light in a unit of a horizontal line. To this end, the emission control signal is set to a gate-off voltage (e.g., a high level), such that some transistors (e.g., P-type transistors) included in the pixels PX can be turned off.

The emission control signal is used to control emission times of the pixels PX. To this end, the emission control signal may be set to have a width wider than those of the first to third scan signals.

The emission driver 500 may supply an emission control signal to the emission control lines E in the first period and the second period. In particular, the emission driver 500 may output the emission control signal at a second frequency regardless of the image refresh rate (e.g., the first frequency).

For example, when the second frequency (i.e., an output frequency of the emission control signal) is 120 Hz and the first frequency (i.e., the image refresh rate) is 60 Hz, the first period and one second period may be alternately repeated. When the second frequency is 120 Hz and the first frequency is 30 Hz, the first period and two second periods may be repeated.

In an exemplary embodiment, when the first frequency and the second frequency are the same, only the first period may be repeated.

The scan driver 200, 300, and 400 may include a plurality of stages configured to shift a scan signal, and the emission driver 500 may include a plurality of stages configured to shift an emission control signal.

The power supply 800 may supply at least one of the first power source VDD, the second power source VSS, the initialization power source Vint, and the bias power source Vbs, based on the power control signal PCS to the pixel unit.

In addition, pixels PX located on a current horizontal line (or current pixel row) may be additionally connected to a scan line located on a previous horizontal line (or previous pixel row) and/or a scan line located on a next horizontal line (or next pixel row) in accordance with a circuit structure of the pixels PX. To this end, dummy scan lines and/or dummy emission control lines may be additionally formed.

In order to implement a high-resolution or stereoscopic image, etc., high speed driving of the display device 1000 may be required. In addition, in order to ensure image quality of at least a certain level, a time required to compensate for a threshold voltage of the driving transistor may need to be sufficiently secured.

Figure 2:
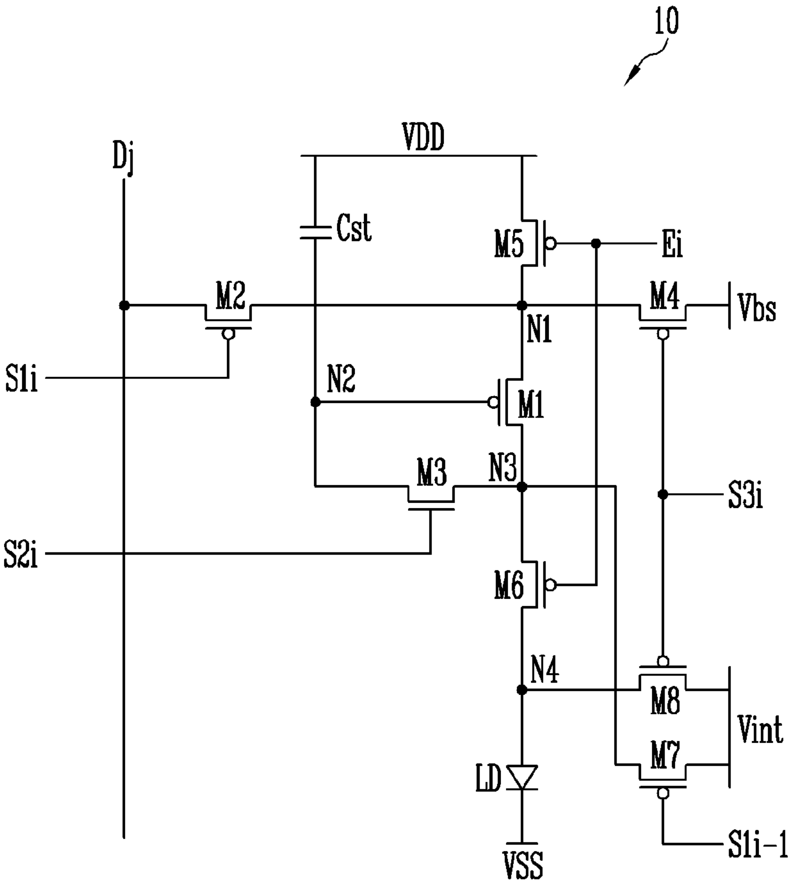
FIG. 2 is a circuit diagram illustrating a pixel included in the display device shown in FIG. 1 according to an exemplary embodiment.

FIG. 2 is a circuit diagram illustrating the pixel included in the display device shown in FIG. 1 according to an exemplary embodiment.

In FIG. 2, the circuit diagram of a pixel located on an $i^{th}$ horizontal line and connected to a $j^{th}$ data line Dj is exemplarily illustrated.

Referring to FIG. 2, the pixel 10 may include a light emitting device LD, first to eighth transistors M1 to M8, and a storage capacitor Cst.

A first electrode (anode electrode or cathode electrode) of the light emitting device LD may be connected to a fourth node N4, and a second electrode (cathode electrode or anode electrode) of the light emitting device LD may be connected to the second power source VSS. The light emitting device LD generates light with a predetermined luminance corresponding to an amount of current supplied from the first transistor M1.

In an exemplary embodiment, the light emitting device LD may be an organic light emitting diode including an organic emitting layer. In another exemplary embodiment, the light emitting device LD may be an inorganic light emitting device formed of an inorganic material. Alternatively, the light emitting device LD may have a form, in which a plurality of inorganic light emitting devices are connected in parallel and/or in series between the second power source VSS and the fourth node N4.

A first electrode of the first transistor M1 (or driving transistor) may be connected to a first node N1, and a second electrode of the first transistor M1 may be connected to a third node N3. A gate electrode of the first transistor M1 may be connected to a second node N2. The first transistor M1 may control an amount of current flowing from the first power source VDD to the second power source VSS via the light emitting device LD in accordance with a voltage of the second node N2. To this end, the first power source VDD may be set to a voltage higher than that of the second power source VSS.

The second transistor M2 may be connected between the data line Dj and the first node N1. A gate electrode of the second transistor M2 may be connected to an $i^{th}$ first scan line S1$i$. The second transistor M2 is turned on when a first scan signal is supplied to the $i^{th}$ first scan line S1$i$ to electrically connect the data line Dj and the first node N1 to each other.

The third transistor M3 may be connected between the second electrode (i.e., the third node N3) of the first transistor M1 and the second node N2. A gate electrode of the third transistor M3 may be connected to an $i^{th}$ second scan line S2$i$. The third transistor M3 is turned on when a second scan signal is supplied to the $i^{th}$ second scan line S2$i$ to electrically connect the second electrode of the first transistor M1 and the second node N2 to each other. As such, when the third transistor M3 is turned on, the first transistor M1 is diode-connected.

In an exemplary embodiment, the third transistor M3 may be formed as an oxide semiconductor transistor. For example, the third transistor M3 may be an N-type oxide semiconductor transistor, and include an oxide semiconductor layer as an active layer. Accordingly, a gate-on voltage, at which the third transistor M3 is turned on, may have a high level.

The oxide semiconductor transistor can be formed through a low temperature process, and has a charge mobility lower than that of a poly-silicon semiconductor transistor. As such, when the third transistor M3 is formed as the oxide semiconductor transistor, leakage current from the second node N2 can be minimized, and accordingly, display quality can be improved.

The fourth transistor M4 may be turned on by a third scan signal supplied to an $i^{th}$ third scan line S3*i* to supply a bias voltage to the first node N1. In an exemplary embodiment, the fourth transistor M4 may be connected between the first node N1 and the bias power source Vbs. A gate electrode of the fourth transistor M4 may be connected to the $i^{th}$ third scan line S3*i*.

The fifth transistor M5 may be connected between the first power source VDD and the first node N1. A gate electrode of the fifth transistor M5 may be connected to an $i^{th}$ emission control line Ei. The fifth transistor M5 is turned off when an emission control signal is supplied to the $i^{th}$ emission control line Ei, and is turned off otherwise.

The sixth transistor M6 may be connected between the second electrode (i.e., the third node N3) of the first transistor M1 and the first electrode (i.e., the fourth node N4) of the light emitting device LD. A gate electrode of the sixth transistor M6 may be connected to the $i^{th}$ emission control line Ei. The sixth transistor M6 is turned off when an emission control signal is supplied to the $i^{th}$ emission control line Ei, and is turned on otherwise.

In an exemplary embodiment, each of the fifth and sixth transistors M5 and M6 may be a P-type poly-silicon semiconductor transistor.

The seventh transistor M7 may be connected between the third node N3 and the initialization power source Vint. A gate electrode of the seventh transistor M7 may be connected to an $(i-1)^{th}$ first scan line S1*i*-1. The seventh transistor M7 is turned on when a scan signal is supplied to the $(i-1)^{th}$ first scan line S1*i*-1 to supply a voltage of the initialization power source Vint to the third node N3.

The seventh transistor M7 may be turned on in a state in which the third transistor M3 is turned on. As such, the voltage of the initialization power source Vint may be supplied to the second node N2 through the third node N3.

In an exemplary embodiment, the voltage of the initialization power source Vint is set to a voltage lower than that of a data signal supplied to the data line Dj. Accordingly, a gate voltage of the first transistor M1 may be initialized to the voltage of the initialization power source Vint when the seventh transistor M7 is turned on.

The eighth transistor M8 may be connected between the initialization power source Vint and the fourth node N4. In an exemplary embodiment, a gate electrode of the eighth transistor M8 may be connected to the $i^{th}$ third scan line S3*i*.

The eighth transistor M8 is turned on when the third scan signal is supplied to supply the voltage of the initialization power source Vint to the first electrode of the light emitting device LD. When the voltage of the initialization power source Vint is supplied to the first electrode of the light emitting device LD, a parasitic capacitor of the light emitting device LD may be discharged. A remaining voltage charged in the parasitic capacitor is discharged (or removed), so that unintended fine light emission can be prevented. Accordingly, the ability to express black in the pixel 10 can be improved.

In an exemplary embodiment, the transistors M1, M2, M4, M5, M6, M7, and M8 except the third transistor M3 may be implemented with a poly-silicon transistor, and include a poly-silicon semiconductor layer as an active layer (or channel). For example, the active layer may be formed through a low-temperature poly-silicon process (e.g., a low-temperature poly-silicon (LTPS) process). For example, each of the transistors M1, M2, M4, M5, M6, M7, and M8 may be a P-type poly-silicon transistor.

Since the poly-silicon semiconductor transistor has a high response speed, the is poly-silicon semiconductor transistor may be applied to a switching element, which requires fast switching.

However, the inventive concepts are not limited thereto, and in some exemplary embodiments, and at least some of the first to eighth transistors M1 to M8 may be implemented with the oxide semiconductor transistor, and the remaining ones of the first to eighth transistors M1 to M8 may be implemented with the poly-silicon transistor.

Figure 3:
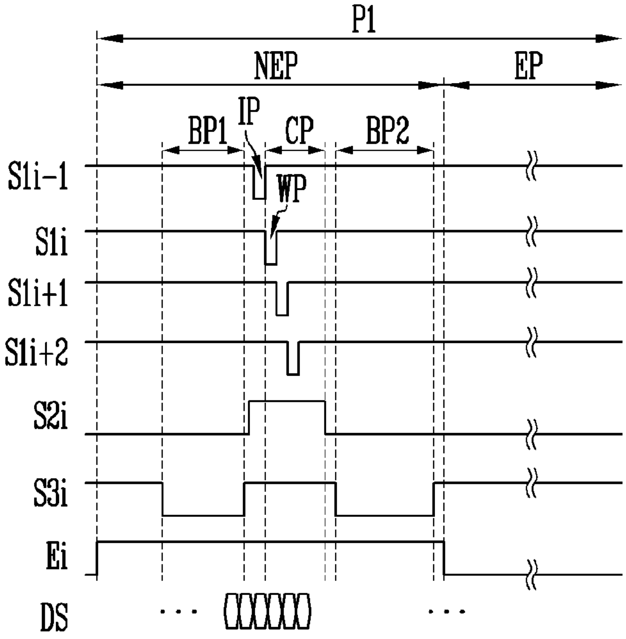
FIG. 3 is a timing diagram illustrating an operation of the pixel shown in FIG. 2 according to an exemplary embodiment.

FIG. 3 is a timing diagram illustrating an operation of the pixel shown in FIG. 2 according to an exemplary embodiment.

Referring to FIGS. 1 to 3, the pixel 10 may be supplied with signals for image display during a first period P1. The first period P1 may include a period, in which a data signal DS substantially corresponding to an output image is written.

Hereinafter, the $i^{th}$ emission control line Ei may also be referred to as the emission control line Ei, and the $i^{th}$ scan lines Sli, S2*i*, and S3*i* may also be referred to as the first scan line Sli, the second scan line S2*i*, and the third scan line S3*i*, respectively.

The pixel 10 and the display device 1000 may be operated in a period divided into an emission period EP and a non-emission period NEP.

FIG. 3 illustrates an operation of the pixel 10 during the first period P1. For example, the display device 1000 may be driven in a first mode in which an image is displayed at a first frequency.

When the display device 1000 is driven in the first mode, the pixel 10 may be supplied with a first scan signal and a second scan signal at the first frequency. A third scan signal and an emission control signal may also be supplied at the first frequency.

A period in which the emission control signal is supplied to the $i^{th}$ emission control line Ei (i.e., a period in which the emission control signal having a high level is supplied) is the non-emission period NEP of the pixel 10. A period in which the emission control signal is not supplied to the $i^{th}$ emission control line Ei (i.e., a period in which the emission control signal having a low level is supplied) is the emission period EP of the pixel 10.

In the non-emission period NEP, the fifth and sixth transistors M5 and M6 are turned off by the emission control signal, and therefore, the pixel 10 does not emit light.

The non-emission period NEP may include a first bias period BP1, an initialization period IP, a write period WP, a compensation period CP, and a second bias period BP2. The second scan signal may be maintained during the initialization period IP, the write period WP, and the compensation period CP. The third scan signal is supplied in the first and second bias periods BP1 and BP2.

In an exemplary embodiment, each of the initialization period IP and the write period WP is a period in which the first scan signal is supplied, and may correspond to about one horizontal period.

After the emission control signal is supplied to the emission control line Ei, the third scan signal may be supplied to the third scan line S3*i* during the first bias period BP1. The third scan signal is a signal for controlling P-type transistors, and has a low level.

Although FIG. 3 exemplarily illustrates that a pulse width of the third scan signal is three horizontal period or more, however, the inventive concepts are not limited thereto. For example, in some exemplary embodiments, the pulse width of the third scan signal may be one horizontal period or more.

In the first bias period BP1, the fourth transistor M4 and the eighth transistor M8 may be turned on in response to the third scan signal. When the fourth transistor M4 is turned on, a voltage of the bias power source Vbs may be supplied to the first node N1, and the first transistor M1 may be in an on-bias state (i.e., on-biased). Accordingly, the voltage of the bias power source Vbs having a constant value is supplied, and thus, a hysteresis characteristic of the first transistor M1 can be improved. The voltage of the bias power source Vbs may be about 5 V or more. For example, the voltage of the bias power source Vbs may be about 5V to about 8 V. A voltage level of the bias power source Vbs can be easily controlled according to driving conditions of the display device 1000. Further, the bias power source Vbs is implemented as a DC voltage source, so that a bias difference between the first transistors M1 of the respective pixels can be reduced.

In addition, when the eighth transistor M8 is turned on, a voltage of the initialization power source Vint may be supplied to the first electrode of the light emitting device LD. When the voltage of the initialization power source Vint is supplied to the first electrode of the light emitting device LD, the parasitic capacitor of the light emitting device LD may be discharged.

After the first bias period BP1 is ended, the second scan signal may be supplied to the second scan line S2*i*. When the second scan signal is supplied to the second scan line S2*i*, the third transistor M3 may be turned on. The second scan signal may have a pulse width of four horizontal periods or more. The third transistor M3 maintains a turn-on state for a long time.

In addition, the first scan signals supplied to an $(i+1)^{th}$ first scan line S1*i*+1 and an $(i+2)^{th}$ first scan line S1*i*+2 may overlap with the second scan signal supplied to the second scan line S2*i*. In an exemplary embodiment, a pixel on an $(i+1)^{th}$ horizontal line and a pixel on the $(i+2)^{th}$ horizontal line may be supplied with the second scan signal supplied to the second scan line S2*i*.

The third scan signal is a signal for controlling an N-type transistor, and has a high level.

The initialization period IP and the write period WP may be performed in a state is in which the third transistor M3 is turned on.

The first scan signal is supplied to a previous first scan line S1*i*−1 in the initialization period IP. When the first scan signal is supplied to the previous first scan line S 1, the seventh transistor M7 may be turned on. Since the third transistor M3 is in a turn-on state, the voltage of the initialization power source Vint may be supplied to the second node N2 through the seventh transistor M7 and the third transistor M3. Therefore, the gate voltage of the first transistor M1 may be initialized.

In some exemplary embodiments, the voltage level of the initialization power source Vint is controlled, so that an on-bias degree of the first transistor M1 can be controlled.

The first scan signal is supplied to the first scan line S1*i* in the write period WP. When the first scan signal is supplied to the first scan line Sli, the second transistor M2 may be turned on. When the second transistor M2 is turned on, the data signal DS may be supplied to the first node N1.

Since the third transistor M3 is in the turn-on state, the first transistor M1 is diode-connected, and the threshold voltage of the first transistor M1 can be compensated. For example, the compensation period CP may include the write period WP.

Subsequently, driving for threshold voltage compensation may be maintained until the supply of the second scan signal is stopped.

When the display device is driven at a high speed, the time of one horizontal period may be shortened, and thus, sufficient threshold voltage compensation may not occur. However, in the display device 1000 according to an exemplary embodiment, the third transistor M3 maintains the turn-on state for a time of five horizontal periods or more, and thus, a threshold voltage compensation time can be sufficiently secured. Accordingly, an image deviation due to a threshold voltage deviation of the first transistor M1 can be minimized.

After the compensation period CP is ended, the third scan signal may be supplied to the third scan line S3*i* again during the second bias period BP2. In the second bias period BP2, the fourth transistor M4 and the eighth transistor M8 may be turned on in response to the third scan signal. An operation of the second bias period BP2 is substantially the same as that of the first bias period BP1, and thus, repeated descriptions thereof will be omitted.

In an exemplary embodiment, the bias periods BP1 and BP2 and the period in which the second scan signal is supplied to the second scan line S2*i* do not overlap with each other. More particularly, a turn-on period of the third transistor M3 and a turn-on period of the fourth transistor M4 do not overlap with each other.

Subsequently, the supply of the emission control signal to the emission control line Ei is stopped. When the supply of the emission control signal to the emission control line Ei is stopped, the fifth and sixth transistors M5 and M6 are turned on. The first transistor M1 controls an amount of driving current flowing through the light emitting device LD in accordance with the voltage of the second node N2. Then, the light emitting device LD generates light with a luminance corresponding to the amount of driving current during the emission period EP.

As described above, in the pixel 10 and the display device 1000 according to an exemplary embodiment, a relatively stable on-bias may be applied to the first transistor M1 (i.e. the first transistor may be stably on-biased) before/after initialization and data write, so that image flicker, an afterimage, etc. due to the hysteresis characteristic of the first transistor M1 can be minimized. Further, since the third transistor M3 is turned on for a relatively long time (e.g., five horizontal periods or more, or 5 μs or more) in accordance with high-speed driving of 120 Hz, a time for threshold voltage compensation can be sufficiently secured, thereby improving image quality.

Figure 4:
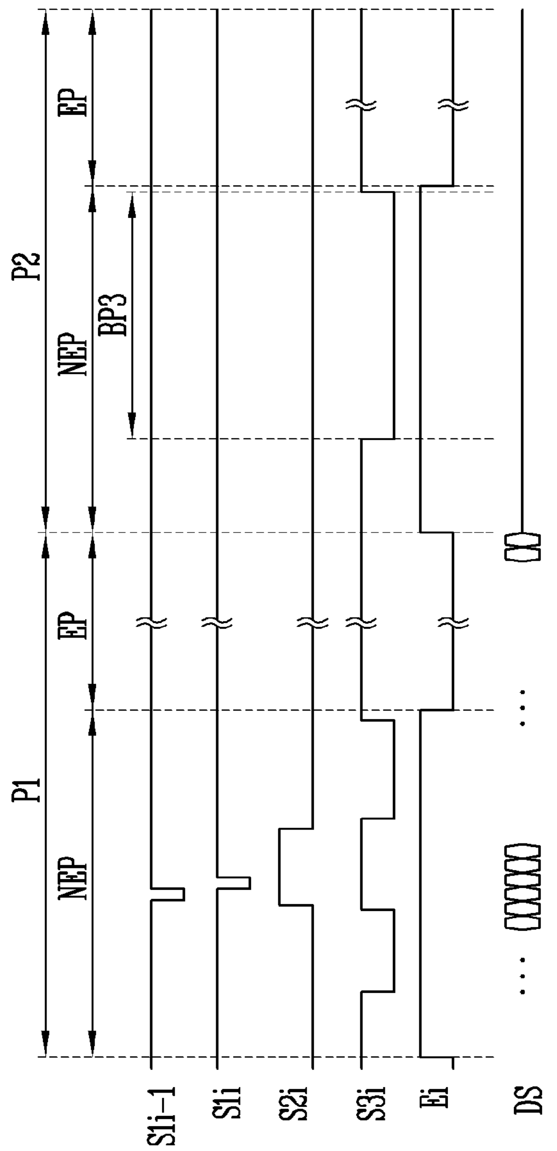
FIG. 4 is a timing diagram illustrating the operation of the pixel shown in FIG. 2 according to another exemplary embodiment.

FIG. 4 is a timing diagram illustrating an operation of the pixel shown in FIG. 2 according to another exemplary embodiment.

Referring to FIGS. 1 to 4, the pixel 10 may be supplied with signals for image display to display an image during a first period P1, and hold the image displayed in the first period P1 during a second period P2.

FIG. 4 exemplarily illustrates the display device 1000 driven at a low frequency. For example, the display device 1000 may be driven in a second mode, in which an image is displayed through the low frequency driving of the display device 1000.

The pixel 10 may be supplied with a first scan signal and a second scan signal at a frequency corresponding to an image refresh rate of the display device 1000. A third scan signal and an emission control signal may be supplied to the pixel 10 at a supply timing equal to that of the scan signal and the emission control signal as shown in FIG. 3, regardless of the image refresh rate.

An operation of the first period P1 is substantially identical to that of the pixel 10 shown in FIG. 3.

In the second period P2, the same emission control signal as that in the first period P1 may be supplied. More particularly, the second period P2 may include an emission period EP and a non-emission period NEP. The first scan signal and the second scan signal are not supplied in the second period P2 as a holding sub-frame.

In an exemplary embodiment, a data signal DS corresponding to an image to be displayed during the second period P2 may not be supplied. For example, an arbitrary data signal DS may be supplied during the second period P2, or the data signal DS may have a state for minimizing power consumption.

The non-emission period NEP of the second period P2 may include a third bias is period BP3. The third scan signal may be supplied to the third scan line S3*i* during the third bias period BP3. In FIG. 4, although a length of the third scan signal supplied in the second period P2 is shown as being longer than that of the third scan signal supplied in the first period P1, the inventive concepts are not limited thereto. For example, in some exemplary embodiments, a pulse width of the third scan signal supplied in the third bias period BP3 may be one horizontal period or more.

When the third scan signal is supplied to the third scan line S3*i*, the fourth transistor M4 and the eighth transistor M8 may be turned on. When the fourth transistor M4 is turned on, the voltage of the bias power source Vbs may be supplied to the first node N1, and the first transistor M1 may be in the on-bias state (i.e., on-biased). When the eighth transistor M8 is turned on, the voltage of the initialization power source Vint may be supplied to the first electrode of the light emitting device LD.

Accordingly, since an on-bias is applied to the first transistor M1 in the second period P2 for holding an image, image flicker, an afterimage, etc. due to the hysteresis characteristic of the first transistor M1 in low frequency driving can be minimized.

Meanwhile, the number of times the second period P2 is consecutively repeated may vary depending on the image refresh rate.

Figure 5A:
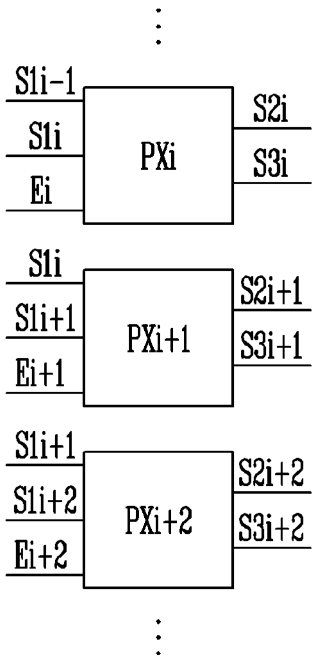
FIG. 5A is a diagram illustrating a connection between pixels and signal lines included in the display device shown in FIG. 1 according to an exemplary embodiment.

FIG. 5A is a diagram illustrating a connection between pixels and signal lines included in the display device shown in FIG. 1 according to an exemplary embodiment.

Referring to FIGS. 1, 2, and 5A, first to third scan lines and emission control lines may be respectively connected to pixels PXi, PXi+1, and PXi+2.

The first scan driver 200 may sequentially supply a first scan signal to the first scan lines S1*i*−1 to S1*i*+2. The second scan driver 300 may sequentially supply a second scan signal to the second scan lines S2*i* to S2*i*+2. The third scan driver 400 may sequentially supply a is third scan signal to the third scan lines S3*i* to S3*i*+2.

As described above with reference to FIG. 2, an $i^{th}$ pixel PXi may be connected to an $(i-1)^{th}$ first scan line S1*i*−1, an $i^{th}$ first scan line Sli, an $i^{th}$ second scan line S2*i*, an $i^{th}$ third scan line S3*i*, and an $i^{th}$ emission control line Ei.

An $(i+1)^{th}$ pixel PXi+1 may be connected to the $i^{th}$ first scan line Sli, an $(i+1)^{th}$ first scan line S1*i*+1, an $(i+1)^{th}$ second scan line S2*i*+1, an $(i+1)^{th}$ third scan line S3*i*+1, and an $(i+1)^{th}$ emission control line Ei+1.

An $(i+2)^{th}$ pixel PXi+2 may be connected to the $(i+1)^{th}$ first scan line S1*i*+1, an $(i+2)^{th}$ first scan line S1*i*+2, an $(i+2)^{th}$ second scan line S2*i*+2, an $(i+2)^{th}$ third scan line S3*i*+2, and an $(i+2)^{th}$ emission control line Ei+2.

As described above, in order to drive the pixels PXi, PXi+1, and PXi+2 corresponding to respective horizontal lines (or pixel rows), the first to third scan drivers 200, 300, and 400 and the emission driver 500 may include stages corresponding to the respective horizontal lines. As such, different timing signals may be supplied to different signal lines.

Figure 5B:
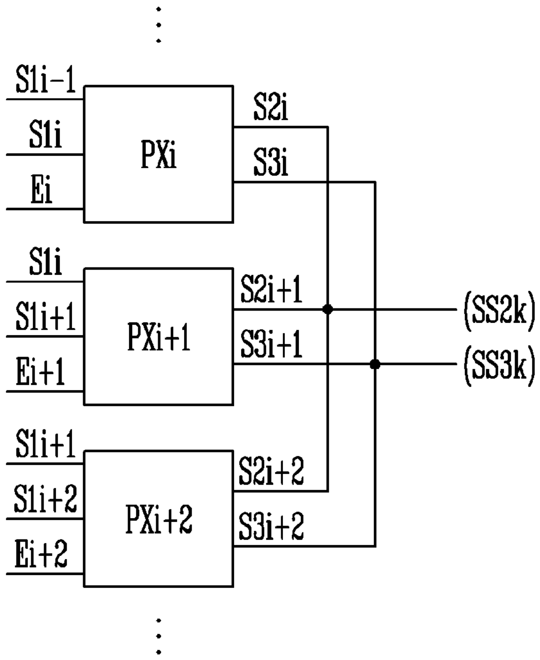
FIG. 5B is a diagram illustrating a connection between the pixels and the signal lines included in the display device shown in FIG. 1 according to another exemplary embodiment.

FIG. 5B is a diagram illustrating a connection between the pixels and the signal lines included in the display device shown in FIG. 1 according to another exemplary embodiment.

In FIG. 5B, components identical to those described with reference to FIG. 5A are designated by like reference numerals, and thus, repeated descriptions of the substantially the same components will be omitted. In addition, connection between pixels and signal lines shown in FIG. 5B may be substantially identical or similar to that shown in FIG. 5A, except the second and third scan lines.

Referring to FIGS. 1, 2, and 5B, first to third scan signals and emission control signals may be connected to the respective pixels PXi, PXi+1, and PXi+2.

In an exemplary embodiment, the $i^{th}$ second scan line S2*i*, the $(i+1)^{th}$ second scan line S2*i*+1, and the $(i+2)^{th}$ second scan line S2*i*+2 may commonly receive a $k^{th}$ (k is a natural number of i or less) second scan signal SS2*k*. More particularly, the $i^{th}$ second scan line S2*i*, the $(i+1)^{th}$ second scan line S2*i*+1, and the $(i+2)^{th}$ second scan line S2*i*+2 share the $k^{th}$ second scan signal SS2*k*.

As such, the same second scan signal (i.e., SS2*k*) may be simultaneously supplied to the $i^{th}$ pixel PXi, the $(i+1)^{th}$ pixel PXi+1, and the $(i+2)^{th}$ pixel PXi+2.

As shown in FIGS. 3 and 4, a pulse width of the second scan signal may overlap with a plurality of first scan signals (e.g., sixth or more first scan signals). Thus, although a common second scan signal (i.e., SS2*k*) is supplied to the $i^{th}$ pixel PXi, the $(i+1)^{th}$ pixel PXi+1, and the $(i+2)^{th}$ pixel PXi+2, initialization, write, and compensation operations of each of the $i^{th}$ pixel PXi, the $(i+1)^{th}$ pixel PXi+1, and the $(i+2)^{th}$ pixel PXi+2 can be performed without an error.

Accordingly, a number of stages included in the second scan driver 300 for outputting the second scan signal can be decreased to ⅓ or less than that shown in FIG. 5A. In this manner, manufacturing cost, dead spaces, and power consumption can be reduced.

Similarly, the $i^{th}$ third scan line S3*i*, the $(i+1)^{th}$ third scan line S3*i*+1, and the $(i+2)^{th}$ third scan line S3*i*+2 may commonly receive a $k^{th}$ third scan signal (i.e., SS3*k*). More particularly, the $i^{th}$ third scan line S3*i*, the $(i+1)^{th}$ third scan line S3*i*+1, and the $(i+2)^{th}$ third scan line S3*i*+2 share the $k^{th}$ third scan signal (i.e., SS3*k*).

As such, the same third scan signal (i.e., SS3*k*) may be simultaneously supplied to the $i^{th}$ third scan line S3*i*, the $(i+1)^{th}$ third scan line S3*i*+1, and the $(i+2)^{th}$ third scan line S3*i*+2.

Accordingly, the $i^{th}$ third scan line S3*i*, the $(i+1)^{th}$ third scan line S3*i*+1, and the $(i+2)^{th}$ third scan line S3*i*+2 can have first to third bias periods BP1 to BP3 at the same time.

Further, a number of stages included in the third scan driver 400 can be decreased is to ⅓ or less that that shown in FIG. 5A. As such, manufacturing cost, dead spaces, and power consumption can be reduced.

However, the inventive concepts are not limited to a particular number of second scan lines sharing the second scan signal and a particularly number of third scan lines sharing the third scan signal. For example, in some exemplary embodiments, the second scan signal may be shared in a unit of two second scan lines, and the third scan signal may be shared in a unit of six third scan lines.

Figure 6A:
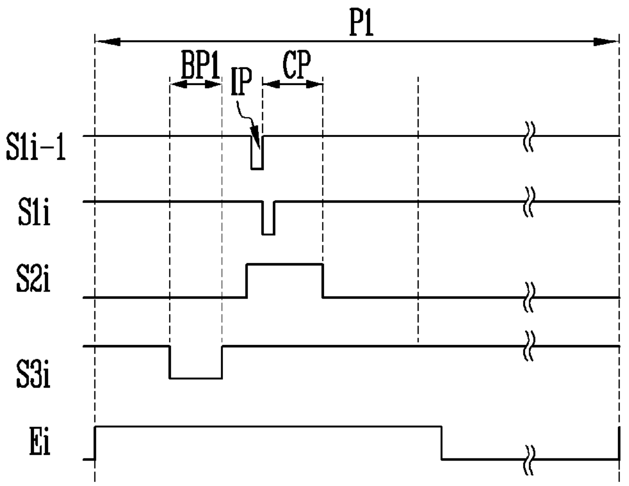
FIGS. 6A and 6B are timing diagrams illustrating an operation of the pixel shown in FIG. 2 according to exemplary embodiments.
Figure 6B:
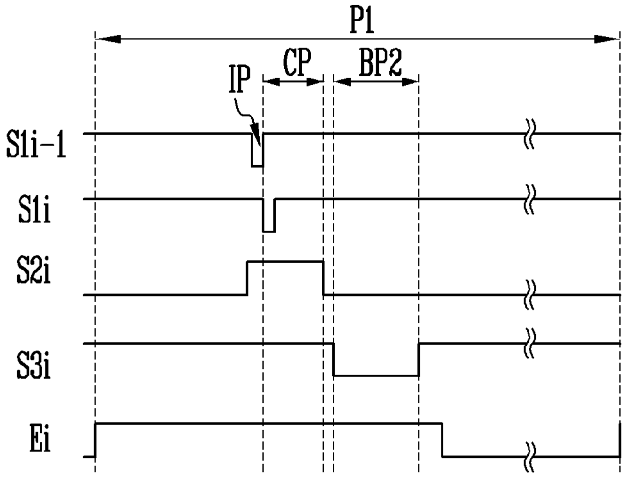

FIGS. 6A and 6B are timing diagrams illustrating an operation of the pixel shown in FIG. 2 according to exemplary embodiments.

Referring to FIGS. 6A and 6B, times and lengths of the bias periods BP1 and BP2 during the first period P1 may be variously controlled.

In an exemplary embodiment, as shown in FIG. 6A, the bias period BP1 in the first period P1 may be activated before the initialization period IP. In particular, the first scan signal may be supplied to the $(i-1)^{th}$ first scan line S1$i$−1 after the third scan signal is supplied to the third scan line S3$i$ in the first period P1. As such, the length of the bias period BP1 may be one horizontal period or more.

In another exemplary embodiment, as shown in FIG. 6B, the bias period BP2 may be activated after the compensation period CP. In particular, the third scan signal may be supplied to the third scan line S3$i$ after the second scan signal is supplied to the second scan line S2$i$. The length of the bias period BP2 may be one horizontal period or more.

As described above, the voltage of the bias power source Vbs is supplied to the first transistor M1 in an optimum period during the non-emission period, so that image flicker, an afterimage, etc. due to the hysteresis characteristic of the first transistor M1 can be minimized.

Figure 7:
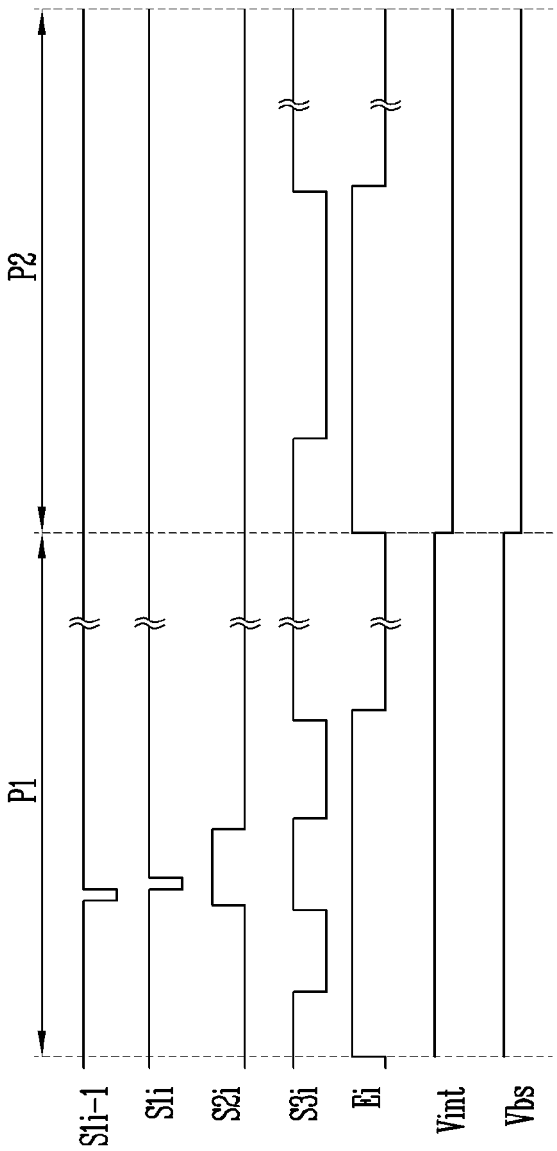
FIG. 7 is a timing diagram illustrating an the operation of the pixel shown in FIG. 2 according to another exemplary embodiment.

FIG. 7 is a timing diagram illustrating an operation of the pixel shown in FIG. 2 is according to another exemplary embodiment.

In FIG. 7, components identical to those described above with reference to FIGS. 3 and 4 are designated by like reference numerals, and thus, repeated descriptions of substantially the same components will be omitted. In addition, operations of the pixel and the display device shown in FIG. 7 may be substantially identical or similar to that shown in FIGS. 3 and 4, except the initialization power source and the bias power source.

Referring to FIGS. 1, 2, and 7, the pixel 10 may be supplied with signals for image display to display an image during the first period P1, and hold the image displayed in the first period P1 during the second period P2.

In an exemplary embodiment, the power supply 800 may supply the bias power source Vbs having different voltage levels in the first period P1 and the second period P2. For example, as shown in FIG. 7, a second voltage level of the bias power source Vbs supplied in the second period P2 may be lower than a first voltage level of the bias power source Vbs supplied in the first period P1.

More particularly, in the first period P1, an on-bias stronger than that in the second period P2 may be applied to the first transistor M1. However, the inventive concepts are not limited thereto, and in some exemplary embodiments, the second voltage level may be higher than the first voltage level. That is, in the second period P2, an on-bias stronger than that in the first period P1 may be applied to the first transistor M1.

In an exemplary embodiment, the initialization power source Vint may also have different voltage levels between the first period P1 and the second period P2. For example, in the second period P2, an initialization voltage lower than that in the first period P1 may be applied to the light emitting device LD and the gate electrode of the first transistor M1.

For example, the voltage level of the initialization power source Vint may be is changed in a range of about −1 to −5 V.

As described above, the voltage level of the bias power source Vbs and/or the voltage level of the initialization power source Vint can be adaptively controlled corresponding to the first and second periods P1 and P2. As such, the image quality in low frequency driving can be further improved.

Figure 8:
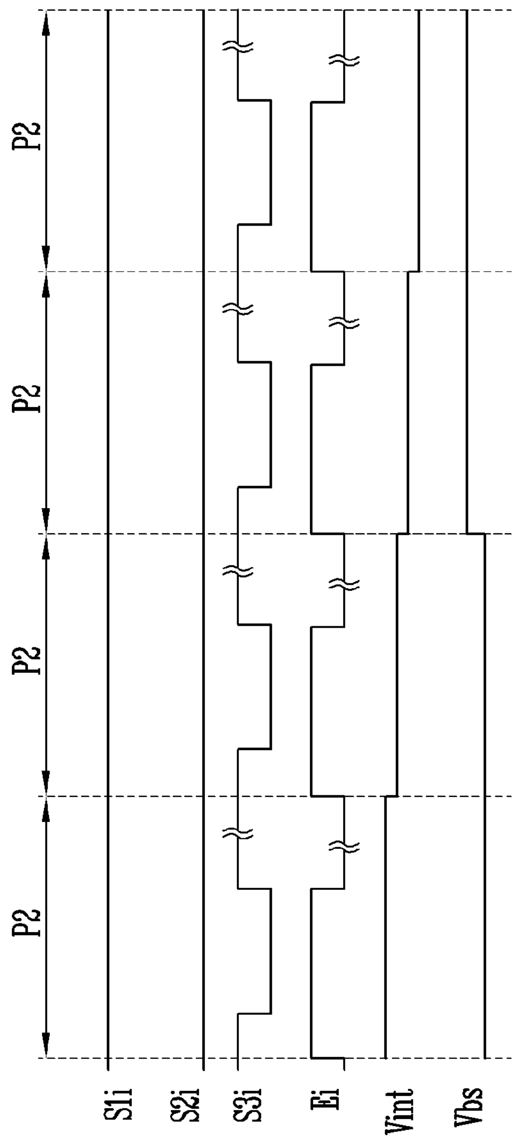
FIG. 8 is a timing diagram illustrating an operation of the pixel shown in FIG. 2 according to another exemplary embodiment.

FIG. 8 is a timing diagram illustrating an operation of the pixel shown in FIG. 2 according to another exemplar embodiment.

In FIG. 8, components identical to those described above with reference to FIGS. 3, 4, and 7 are designated by like reference numerals, and thus, repeated descriptions of substantially the same components will be omitted. In addition, operations of the pixel and the display device shown in FIG. 8 may be substantially identical or similar to that shown in FIGS. 3 and 4, except the initialization power source and the bias power source.

Referring to FIGS. 1, 2, 7, and 8, the pixel 10 may be supplied with signals for image display to display an image during the first period P1, and hold the image displayed in the first period P1 during the second period P2.

The number of times the second period P2 is repeated may be increased as the image refresh rate is decreased (i.e., as the driving frequency is decreased).

In an exemplary embodiment, the power supply 800 may change, in stages, the voltage level of the bias power source Vbs during the second period P2.

In an exemplary embodiment, the voltage level of the bias power source Vbs may be increased corresponding to the repetition of the second period P2. As such, a stronger on-bias may be applied to the first transistor M1 as time elapses in one frame period.

Meanwhile, the voltage level of the bias power source Vbs returns to the lowest set value in the first period P1.

In an exemplary embodiment, the power supply 800 may change, in stages, the voltage level of the initialization power source Vint during the second period P2. For example, the voltage level of the initialization power source Vint may be decreased. Therefore, a lower initialization voltage may be applied to the light emitting device LD as time elapses in one frame period.

Meanwhile, the voltage level of the initialization power source Vint returns to the highest set value in the first period P1.

As shown in FIG. 8, in an exemplary embodiment, a change period of the bias power source Vbs and a change period of the initialization power source Vint may be different from each other.

As described above, the voltage level of the bias power source Vbs and/or the voltage level of the initialization power source Vint can be adaptively controlled corresponding to the first and second periods P1 and P2. As such, the image quality in low frequency driving can be further improved.

Figure 9:
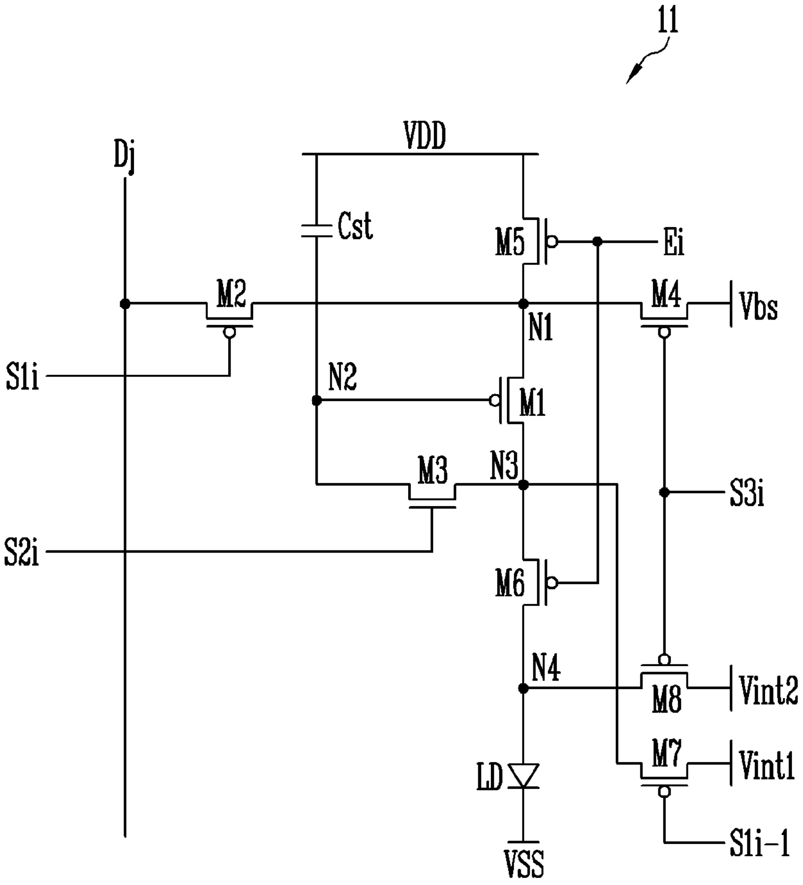
FIG. 9 is a circuit diagram illustrating a pixel included in the display device shown in FIG. 1 according to another exemplary embodiment.

FIG. 9 is a circuit diagram illustrating a pixel included in the display device shown in FIG. 1 according to another exemplary embodiment.

In FIG. 9, components identical to those described above with reference to FIG. 2 are designated by like reference numerals, and thus, repeated descriptions of substantially the same components will be omitted. In addition, the pixel shown in FIG. 9 may be substantially identical or similar to the pixel shown in FIG. 2, except first and second initialization power sources.

Referring to FIGS. 1 and 9, the pixel 11 may include a light emitting device LD, first to eighth transistors M1 to M8, and a storage capacitor Cst.

In an exemplary embodiment, the seventh transistor M7 may be connected between a third node N3 and a first initialization power source Vint1, and the eighth transistor M8 may be connected between a fourth node N4 and a second initialization power source Vint2.

In particular, the power supply 800 may generate the first initialization power source Vint1 corresponding to a voltage supplied to the third node N3, and the second initialization power source Vint2 corresponding to a voltage supplied to the fourth node N4.

In low frequency driving, in which the length of one frame period is lengthened, when the voltage of the first initialization power source Vint1 supplied to the third node N3 is excessively low, a change in hysteresis of the first transistor M1 in the corresponding frame period may be substantial. The hysteresis may cause a flicker phenomenon in the low frequency driving. As such, in the display device driven in a low frequency, the voltage of the first initialization power source Vint that is higher than that of the second power source VSS may be required.

Meanwhile, the second initialization power source Vint2 may have a voltage lower than a predetermined reference, so as to prevent a voltage from being charged in a parasitic capacitor of the light emitting device LD by the voltage of the second initialization power source Vint2, which is supplied to the fourth node N4. For example, the second initialization power source Vint may have a voltage similar to that of the second power source VSS. However, the inventive concepts are not limited thereto, and in some exemplary embodiments, the voltage of the second initialization power source Vint2 may be higher than that of the second power source VSS according to driving conditions of the display device.

Thus, the image quality of the display device 1000 can be improved.

Figure 10:
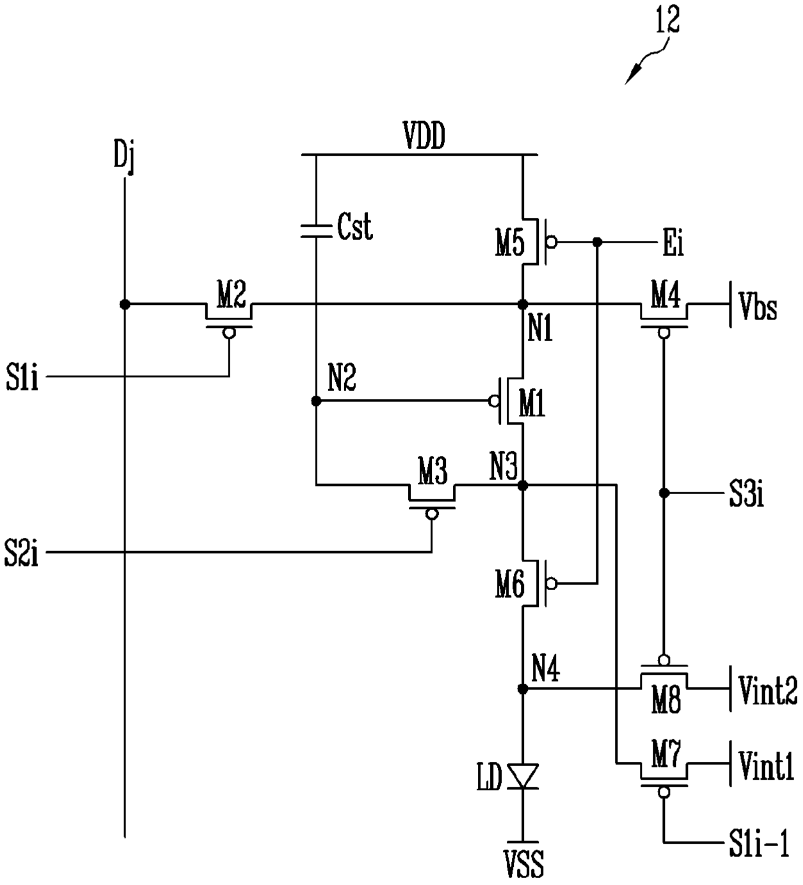
FIG. 10 is a circuit diagram illustrating a pixel included in the display device shown in FIG. 1 according to another exemplary embodiment.

FIG. 10 is a circuit diagram illustrating a pixel included in the display device shown in FIG. 1 according to another exemplary embodiment.

In FIG. 10, components identical to those described above with reference to FIG. 9 are designated by like reference numerals, and thus, repeated descriptions of substantially the same components will be omitted. In addition, the pixel shown in FIG. 10 may be substantially identical or similar to the pixel shown in FIG. 9, except a third transistor.

Referring to FIG. 10, the pixel 12 may include a light emitting device LD, first to eighth transistors M1 to M8, and a storage capacitor Cst.

In an exemplary embodiment, the third transistor M3 may be a P-type poly-silicon semiconductor transistor. The gate-on voltage of a second scan signal supplied to a second scan line S2*i* may be a low voltage.

The transistors M1 to M8 included in the pixel 12 shown in FIG. 10 are all formed through an LTPS process. Thus, a manufacturing process can be simplified, and manufacturing cost can be reduced.

Figure 11:
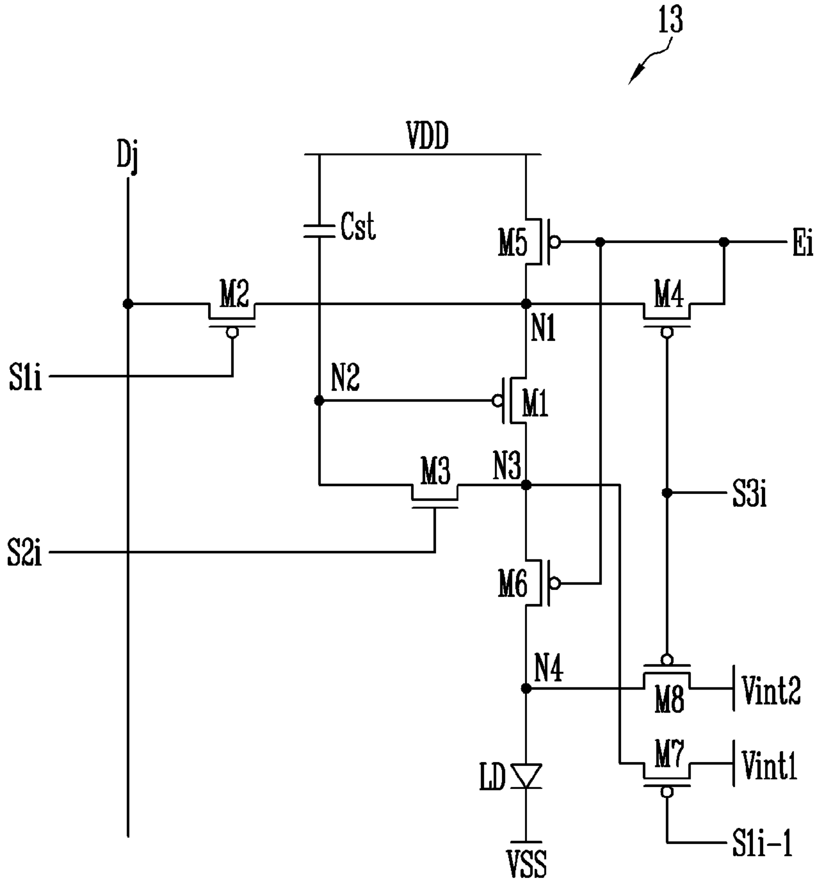
FIG. 11 is a circuit diagram illustrating a pixel included in the display device shown in FIG. 1 according to another exemplary embodiment.

FIG. 11 is a circuit diagram illustrating a pixel included in the display device shown in FIG. 1 according to another exemplary embodiment.

In FIG. 11, components identical to those described above with reference to FIG. 9 are designated by like reference numerals, and thus, repeated descriptions of substantially the same components will be omitted. In addition, the pixel shown in FIG. 11 may be substantially identical or similar to the pixel shown in FIG. 9, except a fourth transistor.

Referring to FIG. 11, the pixel 13 may include a light emitting device LD, first to eighth transistors M1 to M8, and a storage capacitor Cst.

In an exemplary embodiment, the fourth transistor M4 may be connected between a first node N1 and an $i^{th}$ emission control line Ei. When a third scan signal is supplied to an $i^{th}$ third scan line S3*i*, the fourth transistor M4 may be turned on. When the fourth transistor M4 is turned on, a high level of an emission control signal may be supplied to the first node N1. The first transistor M1 may be on-biased by the high level of the emission control signal.

Accordingly, a configuration for generating a bias power source can be omitted. Thus, manufacturing cost and power consumption can be reduced.

Figure 12:
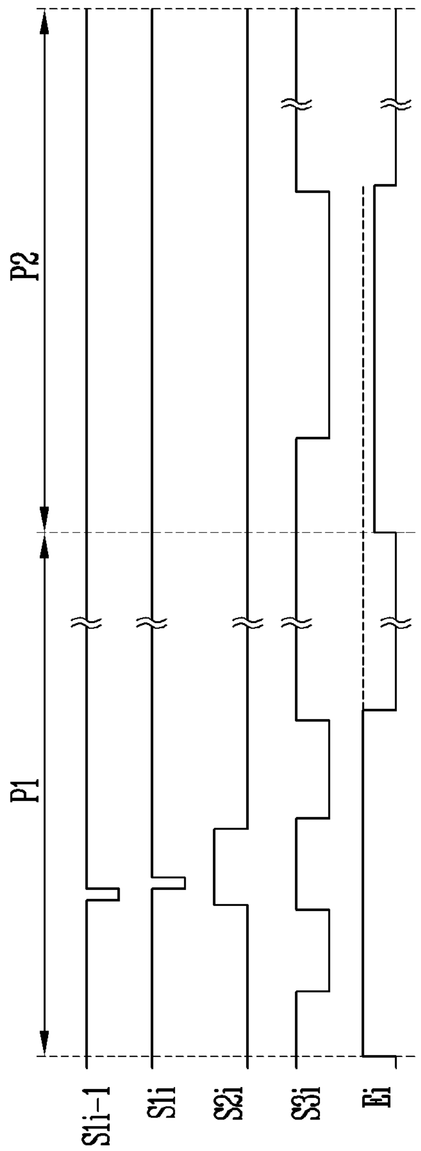
FIG. 12 is a timing diagram illustrating an operation of the pixel shown in FIG. 11 according to an exemplary embodiment.

FIG. 12 is a timing diagram illustrating an operation of the pixel shown in FIG. 11 according to an exemplary embodiment.

In FIG. 12, components identical to those described above with reference to FIGS. 3 and 4 are designated by like reference numerals, and thus, repeated descriptions of substantially the same components will be omitted. In addition, an operation of the display device shown in FIG. 12 may be substantially identical or similar to that of the display device shown in FIGS. 3 and 4, except an emission control signal.

Referring to FIGS. 1, 11, and 12, the pixel 13 may be supplied with signals for image display to display an image during the first period P1, and hold the image displayed in the first period P1 during the second period P2.

In an exemplary embodiment, the emission driver 500 may supply a high level of the emission control signal supplied in the first period P1 and a high level of the emission control signal supplied in the second period P2 as different voltage levels. For example, the high level of the emission control signal supplied in the second period P2 may be lower than that of the emission control signal supplied in the first period P1. Accordingly, a relatively lower (weaker) on-bias may be applied in the second period P2.

However, the inventive concepts are not limited thereto, and in some exemplary embodiments, the high level of the emission control signal supplied in the second period P2 may be higher than that of the emission control signal supplied in the first period P1 according to applied conditions. Accordingly, a relatively stronger on-bias may be applied in the second period P2.

As described above, in the display device including the pixel in accordance with the exemplary embodiments, a stable DC on-bias is applied to the first transistor before/after initialization and data write, so that image flicker, an afterimage, etc. due to the hysteresis characteristic of the first transistor can be minimized. Further, the third transistor is turned on for a relatively long time (e.g., five horizontal periods or more, or 5 μs or more) in accordance with high speed driving of 120 Hz or more. Thus, a time for threshold voltage compensation can be sufficiently secured, thereby improving image quality.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a pixel connected to a first scan line, a second scan line, a third scan line, an emission control line, and a data line;

a first scan driver configured to supply a first scan signal to the first scan line in a first period;

a second scan driver configured to supply a second scan signal to the second scan line in the first period;

a third scan driver configured to supply a third scan signal to the third scan line in the first period and a second period;

an emission driver configured to supply an emission control signal to the emission control line in the first period and the second period; and a data driver configured to supply a data signal to the data line in the first period, wherein a width of the second scan signal is greater than a width of the first scan signal such that the second scan signal overlaps a plurality of first scan signals respectively supplied to is a plurality of first scan lines during the first period.

2. The display device of claim 1, wherein:

the first period is configured to be repeated when an image refresh rate is a first frequency; and the second period is configured to be activated at least once just after the first period when the image refresh rate is less than the first frequency.

3. The display device of claim 1, wherein the plurality of first scan signals overlapping the second scan signal are sequentially supplied to successive first scan lines.

4. The display device of claim 3, wherein a width of the third scan signal is greater than the width of the first scan signal.

5. The display device of claim 4, wherein the third scan signal supplied to the third scan line does not overlap the second scan signal supplied to the second scan line.

6. The display device of claim 5, wherein the third scan driver is configured to supply the third scan signal to the third scan line in the first period for a plurality of times.

7. The display device of claim 5, wherein a gate-on voltage of the first scan signal and a gate-on voltage of the third scan signal are different from a gate-on voltage of the second scan signal.

8. The display device of claim 7, wherein:

the gate-on voltages of the first sand third scan signals are a logic low level; and the gate-on voltage of the second scan signal is a logic high level.

9. The display device of claim 1, wherein the pixel comprises:

a light emitting device;

a first transistor including a first electrode connected to a first node electrically connected to a first power source, and configured to control a driving current based on a voltage of a second node;

a second transistor connected between the data line and the first node, and configured to be turned on in response to the first scan signal supplied to the first scan line;

a third transistor connected between a third node connected to a second electrode of the first transistor and the second node, and configured to be turned on in response to the second scan signal supplied to the second scan line; and a fourth transistor configured to be turned on in response to the third scan signal supplied to the third scan line to supply a bias voltage to the first node.

10. The display device of claim 9, wherein the pixel further comprises:

a fifth transistor connected between the first power source and the first node, and configured to be turned off in response to the emission control signal supplied to the emission control line;

a sixth transistor connected between the third node and a first electrode of the light emitting device, and configured to be turned off in response to the emission control signal; and a storage capacitor connected between the first power source and the second node.

11. The display device of claim 10, wherein the pixel further comprises:

a seventh transistor connected between the third node and a first initialization power source, and configured to be turned on in response to the first scan signal supplied to a previous first scan line; and an eighth transistor connected between the first electrode of the light emitting device and a second initialization power source, and configured to be turned on by the third scan signal supplied to the third scan line.

12. The display device of claim 11, wherein the seventh transistor and the second transistor are configured to be sequentially turned on when the third transistor is turned on.

13. The display device of claim 2, further comprising a power supply configured to supply a bias power source corresponding to a bias voltage to the pixel.

14. The display device of claim 13, wherein the power supply is configured to supply the bias power source having a first voltage level in the first period, and supply the bias power source having a second voltage level different from the first voltage level in the second period.

15. The display device of claim 13, wherein, when the second period is repeated plural times, the power supply is configured to change a voltage level of the bias power source in stages.

* * * * *